May 21, 1946.  E. A. DERUNGS  2,400,633
COUPLING DEVICE
Filed Aug. 12, 1943   2 Sheets-Sheet 1
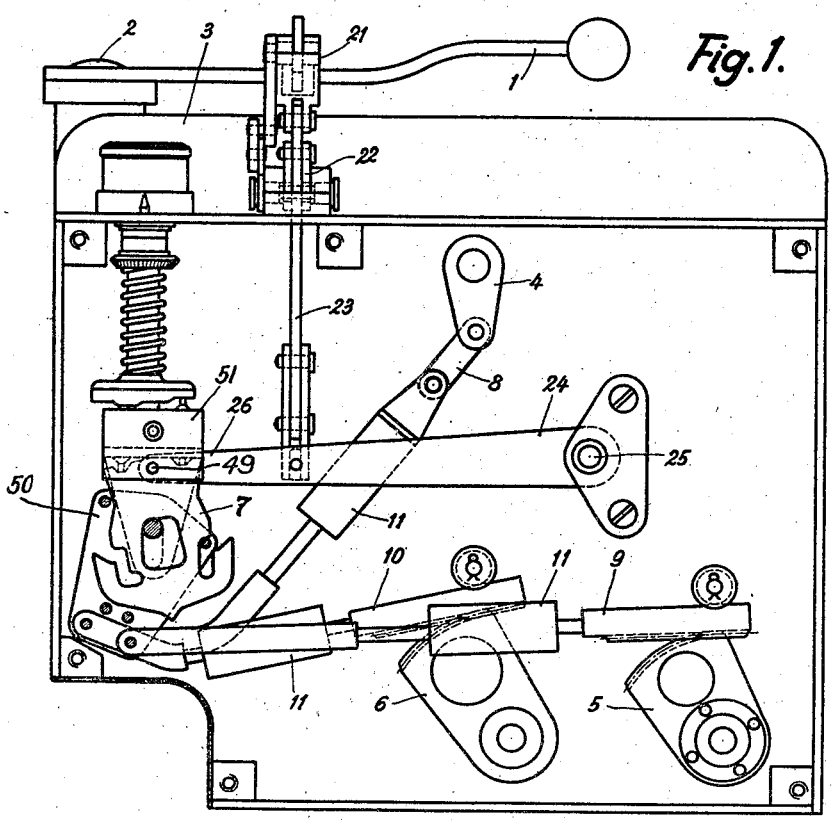
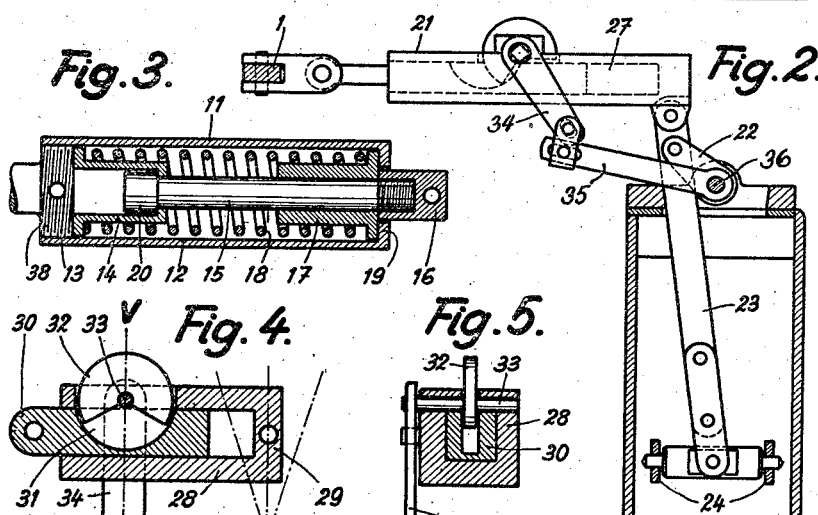
Inventor
E. A. Derungs
By Glascock Downing & Seebold Attys May 21, 1946.  E. A. DERUNGS  2,400,633
COUPLING DEVICE
Filed Aug. 12, 1943    2 Sheets-Sheet 2

Inventor
E. A. Derungs
By Mason, Downing, Ruchle Attys

Patented May 21, 1946

2,400,633

UNITED STATES PATENT OFFICE 2,400,633

COUPLING DEVICE

Ernest Alphonse Derungs, Le Locle, Switzerland
Application August 12, 1943, Serial No. 498,333
In Switzerland September 24, 1942

3 Claims. (Cl. 74—473)

This invention relates to coupling devices, particularly, but not exclusively for gear boxes in certain machine tools. The coupling device according to the invention may be used anywhere it is a question of intercalating one or more intermediate gearings into groups of toothed wheels for the purpose of changing the speed ratio between a driving and a driven shaft. This device may be used to particular advantage in all cases where a certain number of intermediate gearings of different travel must be simultaneously intercalated.

In certain cases, when in a lathe, e. g. it is the question of manipulating the said intermediate gearings with the main coupling and uncoupling lever of the machine, the device according to the invention is combined with special rods allowing the amplitude of this main lever to be divided into a certain number of angles, each corresponding to a special action so that the uncoupling is made independent of the speed changes and vice versa.

The device according to the invention is characterised in that it comprises an elastic element intercalated into the rods of the intermediate gearings, this element reacting both on traction and compression, this for the purpose of permitting the rods to be lengthened or shortened while loading the elastic element in one or the other sense as soon as the effort transmitted by the rods exceeds a certain value.

The accompanying drawings illustrate by way of example, one embodiment of the coupling device according to the invention.

Fig. 1 shows a part of a machine in which the coupling device is used,

Fig. 2 is a partial side view of Fig. 1,

Fig. 3 is a section through the coupling device.

Fig. 4 is an axial section of a coupling,

Fig. 5 is a section along line V—V in Fig. 4,

Figure 6:
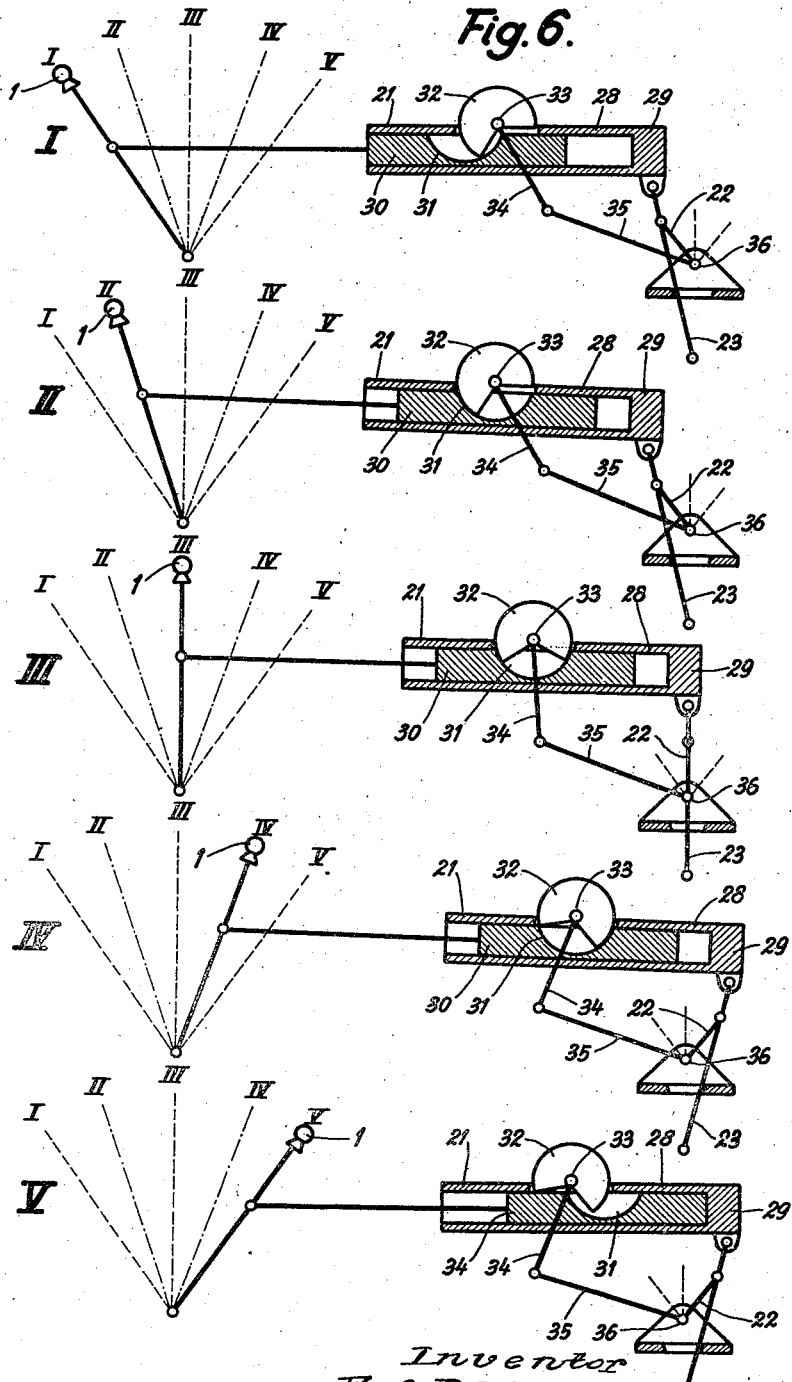
Fig. 6 represents a series of diagrams showing an advantageous manner of applying the mechanism according to the invention to a machine tool having a single main coupling lever for the forward and return movement.

The ensemble illustrated in Fig. 1 comprises a main coupling lever 1 bolted to an axle 2 going off the motor of the machine which is indicated by the reference character 3. The machine in question has three intermediate gearings which are not represented but can be put in and out of action, on the one side, by the crank 4 and, on the other side, by the toothed segments 5 and 6. This crank and these segments are, by means of rods connected to a speed selector of the kind shown in my application Serial No. 497,376, permitting the speed desired of the machine to be predetermined by means of a central organ. For this purpose, it possesses control means acting simultaneously or separately, according to the existing requirements, upon the crank 4 or the toothed segments 5 and 6 respectively, in order to bring them into the engaging position of the intermediate gearing which they control or to withdraw the latter. For this purpose this crank and these toothed segments are connected to the control plates 50 of the selector by means of rods 8, 9 and 10. The different manner in which the plates 50 are acted upon by the selecting tilting members 7, when lever 24 is rotated, is shown in application No. 497,376. The rods 8, 9 and 10, besides the attachments necessary for their connection with the control plates 50 as well as with the crank or the toothed segments, comprise elastic elements 11, all equal with regard to construction, one of which is illustrated on a greater scale in Fig. 3. These elastic elements 11 have a tube 12 which can be attached to the rods by means of a hole 13 in which a sleeve 14 slides serving as a guide to a rod 15 whose head 20 is supported in one direction on a flange of this sleeve. This rod 15, at its other end, carries a coupling member 16 serving, besides, as a stop. Furthermore, this rod 15 goes through a bush 17 pressed against a flange 19 of the tube 12 by a spring 18.

It may be seen in the drawings that the spring 18, which is mounted with a slight initial tension, bears against the flange of the sleeve 14 and against the flange of the bush 17. If a traction is simultaneously exerted on the coupling member 16 and on the bottom 38, which is likewise connected to the rods, the spring 18 is compressed, because the flange of the sleeve approaches the flange of bush 17, the head 20 of the rod 15 remaining in the position represented on the drawings with regard to the sleeve 14. If a compression is simultaneously exerted on the coupling member 16 and on the bottom 38 in order to approach these parts to each other, the head 20 slides in the interior of the sleeve 14 which bears against the bottom 38 and the spring 18, in this case too, is compressed. The material strain of the latter is, therefore, the same in both directions for equal forces. It is understood that, according to the position of the gearings to be engaged for a new speed, it may be that two teeth lie opposite each other and, in consequence, the engagement of the two wheels does not take place at the moment when the new speed is put in. This may also occur owing to differences in the travel of the gearings. Then the elastic member begins to operate: it allows the length of the rods connecting the control means of the selector with the gearings to be varied and that in the one or in the other sense the tension of the spring persisting the engagement of the gearings takes place just at the moment when they commence to rotate.

The coupling lever 1, by means of which the machine can be started in both directions, acts by means of a coupling 21, particularly illustrated in Figs. 2 and 4, and by means of a crank 22 upon a lever 23 pivoted to another lever 24 which is mounted on the point of support 25. This lever 24 is attached by means of a fork 26 and the pins 49 to the block 51 carrying the tilting members 7. When moving lever 1 and when the coupling 21 is in engaged position, lever 24 and, thereby, block 51 is moved and, in consequence, selection of a new speed, i. e. changing of the intermediate gearing takes place.

As shown in Fig. 2 coupling 21 is inserted between the coupling lever 1 and the lever 23, this coupling being represented on a larger scale in Figs. 4 and 5. It comprises a tube 28 of square cross section, closed at the one end by the bottom 29 by means of which it is attached to lever 23. In this tube 28, forming the one half of the coupling 21, slides a piece 30 forming the other half of the coupling. This piece is attached to the rods leading to the coupling lever 1 and has a circular cut-out 31 in which a lock means in the form of a circular segment 32 can rotate. This segment 32 is fixed to an axle 33 pivoted on the walls of the tube 28, a crank 34 being, besides, keyed to this axle 33. This crank 34 is connected to an arm 35 loosely mounted on an axle 36 carrying likewise another crank 22 in connection with the lever 23. This latter is pivotally fixed to the tube 28.

The operation of the device described is illustrated in Fig. 6. In the position I of lever 1 the machine is, for instance, on forward movement. Segment 32 has such a position relatively to the cut-out 31 that lever 1 can be brought into position II, in which the machine is stopped, without that any movement is transmitted to the parts 28, 22, 23 and 24, that is, stopping of the machine takes place without exerting any influence upon the selector. If the machine is again to be brought on forward movement, nothing but returning lever 1 from position II to position I is necessary. If, after stopping, it is desired to act upon the selector in one or another manner, for instance, so as to prepare backward movement of the machine, lever 1 is successively brought into positions III and IV. On doing this, the piece 30, while bearing against the segment 32, has taken along the tube 28 and owing to the connection crank 34—arm 35 the segment 32 has at first taken the position shown in diagram III of Fig. 6. On moving lever 1 from position III to IV, segment 32 is furthermore rotated. On its way from position II to IV lever 23 and, with it, lever 24 have been operated and the selector thus put into action, which has brought the gearings into engagement for backward movement.

If, after having acted upon the selector the machine should be started for backward movement, lever 1 must be brought from position IV, in which tube 28 and the piece 30 are again uncoupled, to position V. During this movement of lever 1 the selector is in no way influenced.

From the above it may be seen that, owing to device 21, stopping, starting and speed change can be effected with one and the same member, viz: lever 1, and, during stopping and starting operation, the speed selector is in no way influenced.

On returning lever 1 from position V to position I backward movement of the machine is at first stopped, then the speed changed by the selector in a forward motion and then the machine started for this latter.

It is understood that other speed changes could be provided than those shown in the example of Fig. 6.

What I claim is:

1. In a coupling device for use with change speed gearing, a controlled member, a coupling and uncoupling lever, and means operatively connecting the lever to said member, said means including a tubular member, a slidable member slidable in the tubular member and provided with a parti-circular recess, a segmental circular element pivotally mounted in the tubular member and extending into said recess, and means for simultaneously turning said segmental circular element upon shifting of said tubular member.

2. In a structure of the character described, an axially movable tubular member, a lever having one of its ends connected to the tubular member, an element to be controlled connected to the other end of the lever, a link having one of its ends pivotally mounted for movement about a fixed axis and its other end pivotally connected to the medial portion of said lever, a manually operated rod-like member slidable in the tubular member and provided with a parti-circular recess, a disk-like element rotatably mounted on the tubular member and adapted to extend into said recess, said disk-like element having a segmental notch therein, a link fixedly secured to the disk-like element to turn therewith, and another link connecting the first-mentioned link to said fixed axis.

3. In a machine, a member for stopping and starting the machine, a coupling device for use with change speed gearing, a speed selector, and means intermittently connecting said member operatively to said speed selector, said means including a tubular member, a slidable member slidable in the tubular member and provided with a parti-circular recess, a segmental circular element pivotally mounted in the tubular member and extending into said recess and means for simultaneously turning said segmental circular element upon shifting of said tubular member for influencing said speed selector.

ERNEST ALPHONSE DERUNGS.